April 24, 1951 K. B. HOPFINGER 2,550,353
MEANS FOR THE VENTILATION OF VEHICLES
Filed July 16, 1949 2 Sheets-Sheet 1
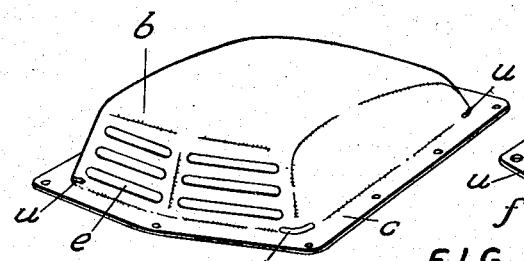
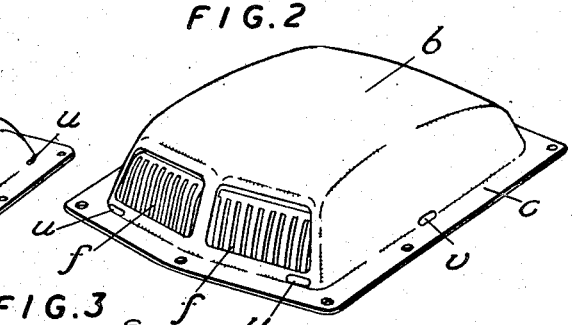
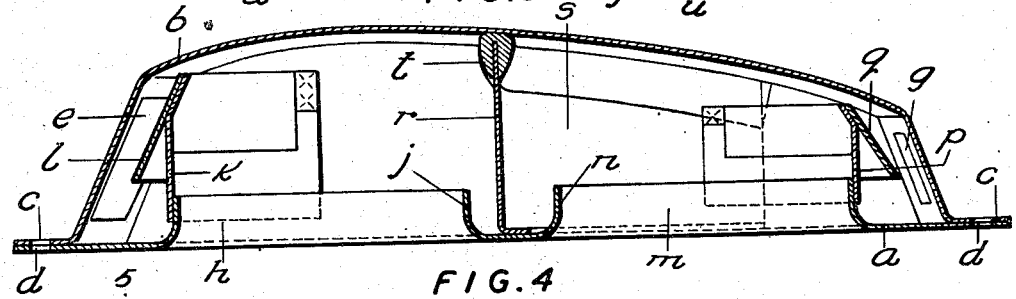
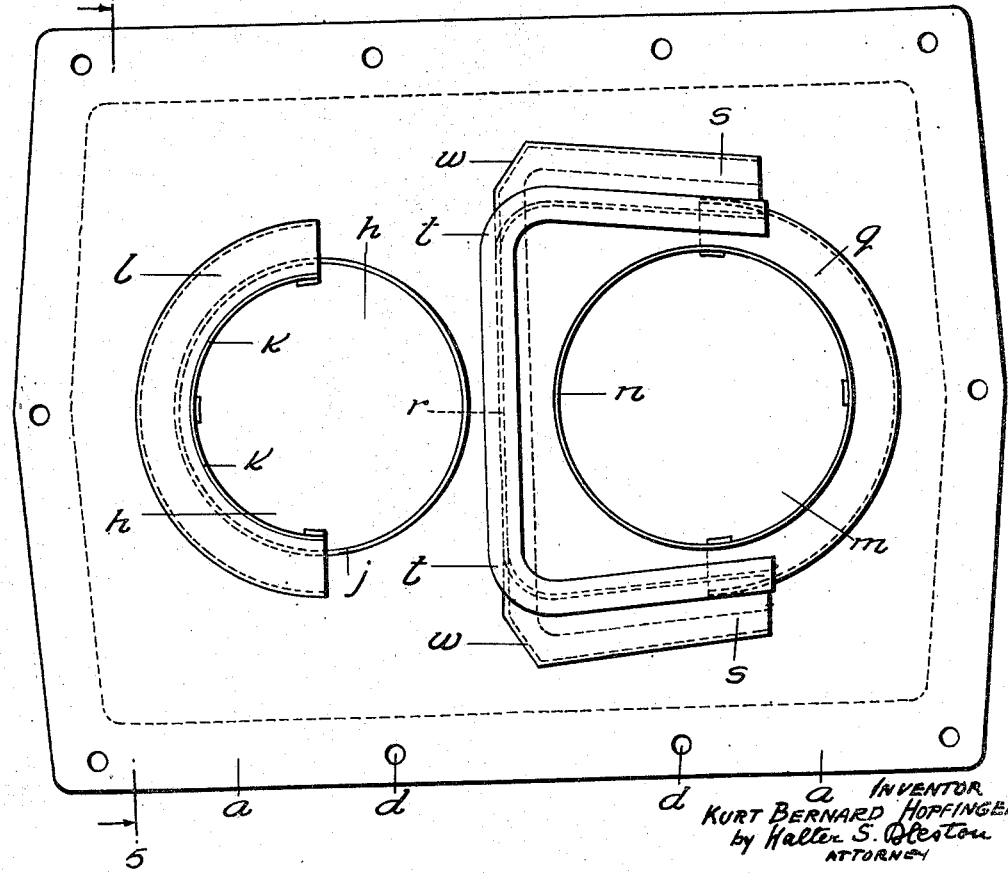
INVENTOR
KURT BERNARD HOPFINGER
by Walter S. Oleston
ATTORNEY April 24, 1951  K. B. HOPFINGER  2,550,353
MEANS FOR THE VENTILATION OF VEHICLES
Filed July 16, 1949  2 Sheets-Sheet 2
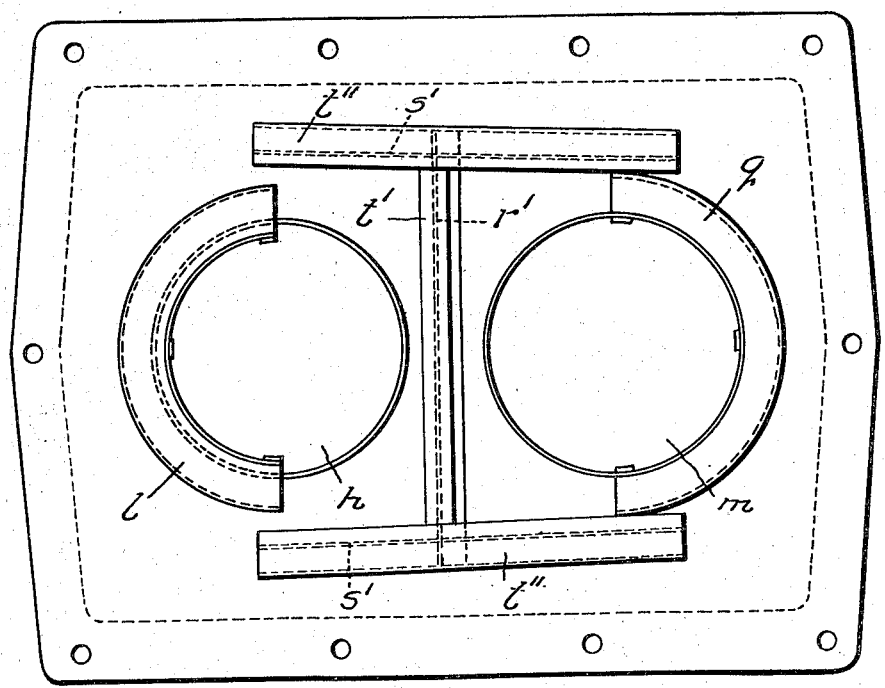
FIG. 6.
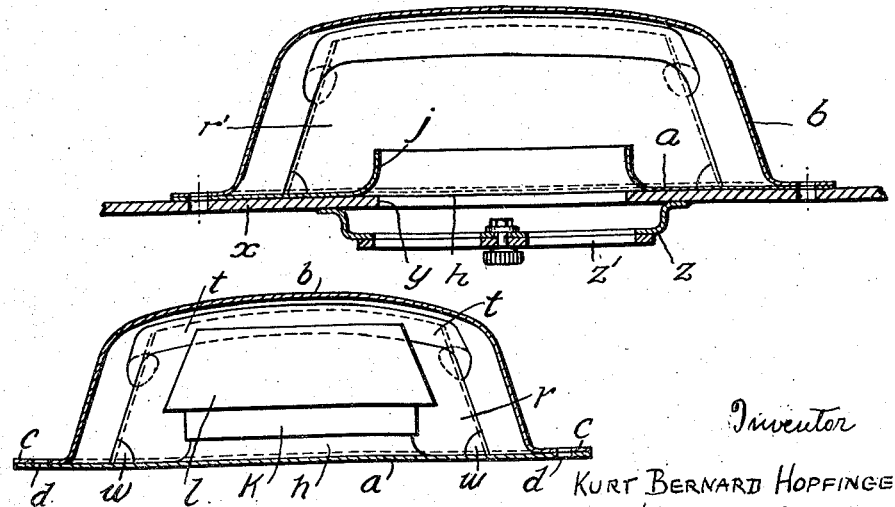
FIG. 7.
FIG. 5.
Inventor
KURT BERNARD HOPFINGER
by Walter S. Pleston
ATTORNEY Patented Apr. 24, 1951

2,550,353

UNITED STATES PATENT OFFICE 2,550,353

MEANS FOR THE VENTILATION OF VEHICLES

Kurt Bernard Hopfinger, Hampton-in-Arden, England, assignor to Weathershields Limited, Birmingham, England Application July 16, 1949, Serial No. 105,083
In Great Britain July 20, 1948

7 Claims. (Cl. 98—2)

This invention relates to new or improved means for the ventilation of vehicles such as saloon cars, motor coaches or omnibuses, ambulances, railway vehicles and the like, or for the ventilation of the driver's cab of public-service or other vehicles.

To ensure adequate ventilation of the interior of a vehicle it is desirable not only that a continuous but controllable supply of fresh air should be introduced but that vitiated air should be withdrawn so that the air is being continually changed and the pressure of the air in the vehicle does not vary appreciably.

According to my invention a ventilating unit for a vehicle comprises a casing adapted to be mounted on or in the roof or wall of a vehicle and having an air inlet at its front end and an air outlet at its rear end. Inlet and extractor openings in the base of the casing leading into the interior of the vehicle are located adjacent the front and rear ends of the casing respectively and are separated by a transverse partition extending between longitudinal partitions which are substantially parallel to but spaced from the side walls of the casing, the ends of the longitudinal partitions terminating short of the ends of the casing. When the vehicle is in motion air enters the casing through the inlet at the front and a proportion of the air passes through the inlet opening in the base into the interior of the vehicle. The remainder of the air flows through the passages formed between the side walls of the casing and the longitudinal partitions and passes out through the outlet at the rear end of the casing. This flow of air causes a reduction of pressure in the rear part of the casing so that air is extracted from the interior of the vehicle through the extractor opening in the base. This effect may be increased by making the casing of such a shape that air flowing over its outer surface causes a reduction of pressure adjacent to the opening in the rear end of the casing.

To diffuse the air entering the vehicle and prevent direct draughts wire gauze or any other suitable diffusing medium may be provided in or below the air inlet in the base of the casing and the opening in the roof or wall through which the air passes may be provided with fixed or movable louvers or vanes for directing the entering air to any desired part of the vehicle.

Similar louvers or vanes may be provided for the extractor opening.

Each of the openings in the base of the casing is preferably provided with an upstanding peripheral lip or rim to prevent the entry into the vehicle of rain or other water which may enter the casing, any such water being drained off through an outlet or outlets at convenient points in the casing.

The ventilator may be made as a unit for fitting at one or more points on the roof or wall of a vehicle or it may be incorporated in the roof or wall in the construction of the vehicle.

The ventilator may extend across the full width of the roof of a vehicle or in the case of a vehicle having a sliding roof a ventilator may be arranged on each side of the roof opening.

Where the ventilator is incorporated in a vehicle roof it may extend for any desired length in a longitudinal direction. For example the inlet opening might be at or adjacent to the front of the roof and the extractor opening at or adjacent to the rear end.

A practical ventilating unit in accordance with my invention for fitting to the roof or to a side wall of a vehicle is illustrated by way of example in the accompanying drawings in which:

Figure 1 is a perspective view of the unit.

Figure 2 is a similar view showing a slight modification.

Figure 3 is a longitudinal vertical section of the unit shown in Figure 1.

Figure 4 is a plan with the top of the casing removed.

Figure 5 is a cross-section on the line 5—5 of Figure 4.

Figure 6 is a plan similar to Figure 4 of a modification, and

Figure 7 is a section along line 7—7 in Figure 4, the ventilator being applied to the roof of a vehicle.

The body of the ventilating unit is formed by two sheet metal pressings comprising a base $a$ which may be flat or may be curved to the contour of a vehicle roof to which it is to be fitted, and a domed cover or casing $b$ having a flat peripheral flange $c$ co-extensive with the peripheral portion of the base to which it is secured by spot-welding or by any other convenient means. The flange $c$ and the underlying parts of the base are pierced with holes $d$ to receive screws or rivets for securing the unit in position.

The front wall of the casing $b$ is inclined rearwardly and is of shallow V outline in plan, as shown in Figures 1 and 4, the rear wall is inclined forwardly and is also of V outline in plan but is of less depth than the front wall, the side walls are inclined towards each other, and the top has a smooth curve sweeping rearwardly from the front wall to the rear wall. Thus as will be seen from Figures 1 and 2 the casing is of streamlined outline and is of such a form that air flowing over its surface causes a reduction of pressure adjacent to the rear end of the casing.

The front wall of the casing is pierced to form air inlet openings which may be slots $e$ pierced in the metal of the casing itself as shown in Figure 1, or may be grilles $ff$ mounted within large openings in the casing as shown in Figure 2.

Similar openings $g$ are pierced in the rear wall of the casing to form air outlets.

The base has pierced in it adjacent to its front end an air inlet opening $h$ provided with an upstanding peripheral lip or rim $j$. An upstanding baffle $k$ of semi-circular outline in plan extends around the front half of the opening $h$, its lower edge fitting around and being welded to the rim $j$. The upper edge of the baffle terminates short of the top of the casing and is inclined inwardly at the same angle as the front wall of the casing, and there is welded to its outer face a depending outwardly flared skirt $l$.

An outlet opening $m$ is pierced in the base adjacent its rear end and has an upstanding peripheral lip or rim $n$. An upstanding baffle $p$ similar to the baffle $k$ extends around the rear half of the opening $m$ and is welded to the rim $n$, and an outwardly flared depending skirt $q$ is secured to the upper part of the baffle.

An upstanding vertical partition $r$ extends partially across the base between the openings $h$ and $m$ and has at each end integral rearward extensions $ss$ forming side partitions parallel to but spaced from the side walls of the casing and extending rearwardly on each side of the opening $m$ beyond the forward ends of the baffle $p$, that is behind the transverse centre line of the opening $m$. The side partitions are inclined inwardly at the same angle as the side walls of the casing, and the depth of the partitions is substantially equal to that of the casing, a compressible rubber bead $t$ being fitted to the upper edge of the partitions to seat against the top of the casing.

In a modification the longitudinal partitions may extend forwardly in front of the transverse partition as well as rearwardly and in that case they will be formed as separate members and the ends of the transverse partition will be welded to them. This is shown in Fig. 6 where the partition $r'$ with compressible rubber bead $t'$ extends between the openings $h$ and $m$ and longitudinal partitions $s'$ connected to the ends of the partition $r'$ and provided each with a bead $t''$ extend beyond the ends of the baffle skirts $l$ and $q$.

When the unit is fitted to the roof or side of a vehicle and the vehicle is in motion air enters the front of the casing through the slots $e$ or grilles $f$ and flows over and around the baffle $k$ which extends around the front of the inlet opening $h$ in the base. Some of the air flows directly into the opening $h$ after it has passed the baffle $k$ or is deflected by the transverse partition $r$ forwardly into the opening. The remainder of the air flows between the longitudinal partitions $ss$ and the side walls of the casing and passes out through the openings $g$ in the rear wall of the casing. This flow of air causes a reduction of pressure in the rear part of the casing so that air is extracted from the rear opening $m$ in the base through the space between the partitions $ss$ and the edges of the baffle $p$, this effect being increased by the reduction in pressure adjacent the rear wall of the casing caused by the flow of air over the outside of the casing.

The baffles $k$ and $p$ with their flared skirts effectively prevent rain blown into the casing through the openings $ef$ or $g$ from being blown into the openings $h$ or $m$ and the rims around these openings prevent water from draining into them.

Apertures $u$ are pierced in the casing $b$ at or adjacent to the corners as shown in Figures 1 and 2 to allow water to drain out of the casing, and further apertures $v$ may be provided at the middle of the length of each side of the casing as shown in Figure 2.

Apertures $w$ may also be provided at the bottom of the partition $r$ at its junction with the side partitions as shown in Figures 4 and 5 to prevent water from accumulating within the partitions.

When the ventilator is mounted on the roof or side of a vehicle openings will of course be cut in the roof or side panel in alignment with and co-extensive with the openings $h$ and $m$ in the base of the ventilator, and one or each opening may be provided with a wire gauze cover or other air diffusing means or with a grille which may have means for closing it in cold weather. An arrangement of the last mentioned kind is illustrated in Fig. 7. In this figure, the ventilator of Figs. 1 to 5 is applied to the roof $x$ of a vehicle. The roof has an opening $y$ in registry with the hole $h$ and a grill structure of a conventional type comprising a perforated stationary part $z$ and rotary part $z'$ is secured to the roof underneath the opening $y$. In the illustrated position the ventilator communicates with the interior of the car. By turning part $z'$ the perforations of the part $z$ can be closed and the communication interrupted.

I claim:

1. A ventilating unit for a vehicle body comprising a casing including side walls, front and rear end walls, a top, and a base adapted for securing to a part of the body, openings in the front and rear end walls of the casing for the passage of air, inlet and extractor openings in said base adapted to communicate with the interior of said body and located adjacent the front and rear ends of the casing respectively, a transverse partition in the casing and extending from the base to the top of the casing between the inlet and extractor openings, and longitudinal partitions in the casing which also extend from the base to the top of the casing and are substantially parallel to and spaced from the side walls of the casing and between which said transverse partition extends, the ends of said longitudinal partitions terminating short of the end walls of the casing.

2. A ventilating unit for a vehicle body comprising a casing including a base adapted for securing to a part of the body and a domed cover having front and rear end walls and side walls and a peripheral flange overlying and secured to the periphery of the base, openings in the front and rear of said cover for the passage of air, inlet and extractor openings in said base adapted to communicate with the interior of the body and located adjacent the front and rear ends of the casing respectively, a transverse partition in the casing and extending from the base to the top of the casing between the inlet and extractor openings, and longitudinal partitions in the casing which also extend from the base to the top of the casing and are substantially parallel to and spaced from the side walls of the cover and between which said transverse partition extends, the ends of said longitudinal partitions terminating short of the end walls of the cover.

3. A ventilating unit comprising a casing including side walls, front and rear end walls, a top, and a base adapted for securing to a part of the body, openings in the front and rear end walls of the casing for the passage of air, inlet and extractor openings in said base adapted to communicate with the interior of said body and located adjacent the front and rear ends of the casing respectively, a peripheral upstanding flange around each of said openings, a baffle of less height than the casing extending around the front half of the inlet opening, a similar baffle extending around the rear half of the extractor opening, a transverse partition in the casing and extending from the base to the top of the casing between the inlet and extractor openings, and longitudinal partitions in the casing which also extend from the base to the top of the casing and are substantially parallel to and spaced from the side walls of the casing and between which said transverse partition extends, the ends of said longitudinal partitions terminating short of the end walls of the casing.

4. A ventilating unit as in claim 3 in which the upper parts of said baffles are inclined inwardly and carry depending outwardly flared skirts.

5. A ventilating unit as in claim 3 in which said casing comprises a base and a cover having inwardly inclined front, rear and side walls and a curved top, the front wall being of greater height than the rear wall.

6. A ventilating unit for a vehicle body comprising a casing including side walls, front and rear end walls, a top, and a base adapted for securing to a part of the body, openings in the front and rear end walls of the casing for the passage of air, inlet and extractor openings in the base adapted to communicate with the interior of said body and located adjacent the front and rear ends of the casing respectively, a partition of less width than the casing extending transversely between the inlet and extractor openings and extending from the base to the top of the casing, and longitudinal partitions extending rearwardly from the ends of said transverse partition on each side of the extractor opening in the base and also extending from the base to the top of the casing, said longitudinal partitions being substantially parallel to the side walls of the casing and terminating short of the rear end wall of the casing.

7. A ventilating unit as in claim 6 in which a rubber bead is mounted on the upper edges of said transverse and longitudinal partitions to bear against and form a seal with the top of said casing.

KURT BERNARD HOPFINGER.

REFERENCES CITED

The following references are of record in the file of this patent:

UNITED STATES PATENTS

| Number | Name | Date |
| --- | --- | --- |
| 1,982,747 | Kurth | Dec. 4, 1934 |

FOREIGN PATENTS

| Number | Country | Date |
| --- | --- | --- |
| 214,287 | Great Britain | Apr. 16, 1924 |
| 521,171 | Great Britain | May 14, 1940 |
| 566,517 | Great Britain | Jan. 2, 1945 |